US011605142B2

(12) United States Patent
Cheng-Shorland et al.

(10) Patent No.: US 11,605,142 B2
(45) Date of Patent: *Mar. 14, 2023

(54) BLOCKCHAIN-POWERED OFFER MANAGEMENT AND TRANSACTION MANAGEMENT SYSTEM

(71) Applicant: ShelterZoom Corp., New York, NY (US)

(72) Inventors: Chao Cheng-Shorland, New York, NY (US); Amir Homayoun Alishahi, New York, NY (US)

(73) Assignee: ShelterZoom Corp., New York, NY (US)

( * ) Notice: Subject to any disclaimer, the term of this patent is extended or adjusted under 35 U.S.C. 154(b) by 91 days.

This patent is subject to a terminal disclaimer.

(21) Appl. No.: 17/344,004

(22) Filed: Jun. 10, 2021

(65) Prior Publication Data

US 2021/0304332 A1 Sep. 30, 2021

Related U.S. Application Data

(63) Continuation of application No. 16/121,391, filed on Sep. 4, 2018, now Pat. No. 11,062,407.

(Continued)

(51) Int. Cl.
*G06Q 50/16* (2012.01)
*G06Q 30/06* (2012.01)
(Continued)

(52) U.S. Cl.
CPC .......... *G06Q 50/16* (2013.01); *G06Q 20/367* (2013.01); *G06Q 30/0617* (2013.01);
(Continued)

(58) Field of Classification Search
CPC .. G06Q 50/16; G06Q 30/0645; G06Q 50/188; H04L 9/088; H04L 51/046; H04L 9/50
See application file for complete search history.

(56) References Cited

U.S. PATENT DOCUMENTS 8,219,558 B1   7/2012   Trandal et al.
8,719,952 B1   5/2014   Damm-Goossens
(Continued)

FOREIGN PATENT DOCUMENTS

CA       2654647 A1 * 12/2007   ........... G06F 16/986
GB       2382687 A  *  6/2003   ............ G06Q 30/02
WO    WO-2005024601 A2 *  3/2005   ............ G06F 16/29

OTHER PUBLICATIONS

Anonymous Computer Hope "What is autofill" Jan. 6, 2013, https://web.archive.org/web/20130106180857/https://www.computerhope.com/jargon/a/autofill.htm (Year: 2013).*

(Continued)

*Primary Examiner* — Gerardo Araque, Jr.
(74) *Attorney, Agent, or Firm* — Sterne, Kessler, Goldstein & Fox P.L.L.C.

(57) ABSTRACT

A transaction system has Internet-connected partner platforms which display webpages with an Offer-Now button initiating coded instructions to display an electronic input form enabling a person to configure a transaction offer, and an Internet-connected service enterprise providing the coded instructions to the partners, configured specifically to partner requirements. Upon the person activating the Offer Now button from a mobile device, a verification code is sent to the device, to be returned to verify the device, and offer input provided through the device and the electronic form is tracked to be saved as an offer for the transaction.

20 Claims, 10 Drawing Sheets

Related U.S. Application Data

(60) Provisional application No. 62/605,943, filed on Sep. 5, 2017.

(51) Int. Cl.

| | | |
|---|---|---|
| *H04L 51/046* | (2022.01) | |
| *H04L 9/08* | (2006.01) | |
| *H04L 9/32* | (2006.01) | |
| *G06Q 50/18* | (2012.01) | |
| *H04L 9/00* | (2022.01) | |
| *G06Q 20/36* | (2012.01) | |
| *G06Q 30/0645* | (2023.01) | |
| *G06Q 30/0601* | (2023.01) | |

(52) U.S. Cl.
CPC ..... *G06Q 30/0641* (2013.01); *G06Q 30/0645* (2013.01); *G06Q 50/188* (2013.01); *H04L 9/088* (2013.01); *H04L 9/3239* (2013.01); *H04L 9/3297* (2013.01); *H04L 51/046* (2013.01); *G06Q 2220/00* (2013.01); *H04L 9/50* (2022.05)

(56) References Cited

U.S. PATENT DOCUMENTS

| | | | |
|---|---|---|---|
| 10,121,183 B2 * | 11/2018 | Traina | G06Q 30/0635 |
| 2002/0198736 A1 | 12/2002 | Harrison | |
| 2003/0050834 A1 * | 3/2003 | Caplan | H04L 69/165 |
| | | | 348/E7.071 |
| 2003/0078897 A1 * | 4/2003 | Florance | G06Q 30/02 |
| | | | 705/80 |
| 2004/0098315 A1 * | 5/2004 | Haynes | G06Q 30/0641 |
| | | | 705/26.8 |
| 2004/0128215 A1 * | 7/2004 | Florance | G06Q 10/087 |
| | | | 705/28 |
| 2005/0010537 A1 * | 1/2005 | Ettinger | G06Q 10/087 |
| | | | 705/80 |
| 2006/0136595 A1 * | 6/2006 | Satyavolu | H04L 63/08 |
| | | | 709/229 |
| 2006/0173985 A1 * | 8/2006 | Moore | H04L 67/00 |
| | | | 707/E17.116 |
| 2007/0094076 A1 | 4/2007 | Perkowski et al. | |
| 2007/0192115 A1 | 8/2007 | Oliver | |
| 2009/0024404 A1 | 1/2009 | Morley et al. | |
| 2009/0150920 A1 * | 6/2009 | Jones | H04N 21/4788 |
| | | | 725/23 |
| 2010/0262478 A1 | 10/2010 | Bamborough et al. | |
| 2011/0145424 A1 | 6/2011 | Sattari et al. | |
| 2011/0162052 A1 * | 6/2011 | Hayward | G06F 21/577 |
| | | | 726/5 |
| 2011/0264561 A1 * | 10/2011 | Sundaresan | G06Q 30/08 |
| | | | 707/769 |
| 2011/0288891 A1 * | 11/2011 | Zaid | G06Q 30/0611 |
| | | | 705/26.4 |
| 2011/0320349 A1 | 12/2011 | Olsen et al. | |
| 2012/0233020 A1 | 9/2012 | Eberstadt et al. | |
| 2012/0254156 A1 | 10/2012 | Rao | |
| 2013/0073473 A1 | 3/2013 | Heath | |
| 2014/0207551 A1 | 7/2014 | Van Der Spoel | |
| 2014/0214554 A1 | 7/2014 | Lang et al. | |
| 2015/0254762 A1 * | 9/2015 | Fisher | G06Q 30/08 |
| | | | 705/26.3 |
| 2016/0328459 A1 * | 11/2016 | Somaiya | G06F 16/951 |
| 2017/0116691 A1 | 4/2017 | Syiau | |
| 2017/0185596 A1 | 6/2017 | Spirer | |
| 2017/0232300 A1 | 8/2017 | Tran et al. | |
| 2020/0234386 A1 | 7/2020 | Blackman et al. | |

OTHER PUBLICATIONS

Brad Andersohn "How to Post Your Real Estate Listings for Free on Zillow" Jun. 18, 2014, https://www.zillow.com/agent-resources/blog/post-real-estate-listings-for-free/ (Year: 2014).*

Divya Nema, "Jquery Autocomplete With and Without Ajax", Nov. 2, 2012, https://mobisoftinfotech.com/resources/blog/web-programming/jquery-autocomplete-with-and-without-ajax/ (Year: 2012).*

Caroline Feeney "Every lhing you need to know about Zillow Instant Offers" May 26, 2017, https://www.inman.com/2017/05/26/everylhing-you-need-to-know-about-zillow-instant-offers/ (2017).

Flex Offers "Affiliate Programs" Aug. 14, 2017, https://web.archive.org/web/20170814101017/hllps://www.flexoffers.com/ affiliate-programs/business/real-estate/ (2017).

M. lvkovic and D. Milanov, "Affiliate internet marketing: Concept and application analysis," 2010 International Conference on Education and Management Technology, Cairo, Egypt, 2010, pp. 319-323, (2010).

T. Kwok and Thao Nguyen, "A novel Web sales tracking solution for multi-channel marketing programs on electronic commerce," Proceedings. IEEE International Conference on e-commerce Technology, 2004. CEC 2004., San Diego, CA, USA, 2004, pp. 362-365 (2004).

"How Tapfiliate Works" Tapfiliate, Aug. 28, 2017, https://web.archive.org/web/20170828230100/hllps://tapfiliate.com/ (2017).

Hongmin Zhou, Xiaochen Zhou, Zhijun Wang and Xi Zhang, "Research on network marketing of real estate enterprises," The 2nd International Conference on Information Science and Engineering, Hangzhou, China, 2010, pp. 3048-3051 (2010).

"The great chain of being sure about things", The Economist, https://www.economist.com/briefing/2015/10/31/ the-great-chain-of-being-sure-about-things, Oct. 31, 2015 (2015).

Peter Ajn Vanleeuwen, Douwe van de Ruit, "Blockchain—Operator Opportunities," GSMA Internet Group, Version 1, Jul. 2018, https://www.gsma.com/newsroom/wp-content/uploads/1G.03-v1.O_Whitepaper.pdf (2018).

Kirk McElhearn, "Protect Your Amazon Account with Two-Step Verification," intego.com, Nov. 24, 2015, https:// www.intego.com/mac-security-blog/protect-your-amazon-account-with-two-step-verification/ (2015).

\* cited by examiner

Submit an Offer

Cancel | Submit an Offer

Submitting an offer on:
🏠 Property Address:
3532 Alexandria Pike,
Indianapolis, IN 95024

👤 Agent's Name:
Moises Rodriguez

☐ Agent's Mobile Phone:
832-989-1767

Purchaser:
Name:
Address:
email:
Mobile Phone

I Am
☐ The buyer
☐ The buyer's agent

— 401
— 402

— 306 Offer Now

— 403
By submitting this offer you verify that you have reviewed and agree to the privacy policy and legal terms.

☐ Accept terms and conditions

SUBMIT

*Fig. 4*

BLOCKCHAIN-POWERED OFFER MANAGEMENT AND TRANSACTION MANAGEMENT SYSTEM

CROSS-REFERENCE TO RELATED APPLICATIONS

The present application claims priority to U.S. patent application Ser. No. 16/121,391 filed on Sep. 4, 2018, which claims priority to Provisional Patent Application 62/605,943, filed Sep. 5, 2017. All disclosure of the parent applications are incorporated in the application at least by reference.

BACKGROUND

Field

The present invention is in the technology of real estate transactions, and pertains more particularly to a system for integrating existing real-estate businesses, landlords, clients and individuals into a cooperative, secure system.

Related Art

The real estate model, considering both rental, leasing, and sales, at the time of the application is rife with inefficiencies. Among these are:
- a requirement for a great deal of paperwork
- a need for face-to-face interaction among the parties to any transaction, and
- a lack of technological capability to accomplish legally-binding property purchase, lease or rental rapidly, and with full documentation and security.

The antiquated system of preparing, reading, signing and filing hard-copy documents is time-consuming and wasteful.

In addition to the above, the current real estate process of offers and counter offers lacks transparency and auditability. This system relies on agents to do the right and necessary things, and not all agents are experienced and trained, and many vary the process. Buyers and sellers do not have an overview of the process. For example, a potential buyer in a proposed real estate transaction does not have a tool to track status of an offer; a seller cannot track how many offers have been received on a property, and how the agent is handling those offers without speaking to the agent. The same problems are endemic in the rental property application process at the time of this application. A crisis in confidence is an inevitable result.

Further to the above, there are a great number of real estate websites active on the Internet. Each one of these sites executes a different process and has a different user interface for searching for properties for sale. A property search on one website does not provide any insight for another website, such as, for example, Zillow™, Realtor.com™, Re/Max™, Sotheby's™, and MLS™ organizations are all running websites independently without any shared insights.

Still further, the existing real estate operating model incurs high running cost and overhead. Typically, real estate selling or renting services are bundled, that is, a seller cannot specify which services he/she wants to procure and from whom. The model is not flexible enough to tailor for consumers' budget and needs. Typically, it is necessary in any transaction to independently search for and deal with service providers completely independently.

What is clearly needed is a transaction system that connects any, and potentially all, existing real estate platforms in a way that standardizes the processes, brings individuals into the process as equal players, and provides tools not before available for maximizing the goals of sellers, renters, landlords and service businesses as well, in a completely secure manner, while affording participants ready access to all information regarding their own transactions, but only their own.

BRIEF SUMMARY

In an embodiment of the invention a transaction system is provided, comprising a plurality of Internet-connected, computerized partner platforms, providing to persons connected to the partner platforms by computerized devices, displays including information regarding specific properties offered for sale or rent, the displays including images, description and offer details, an Offer-Now button in the displays regarding the specific properties for sale or rent, coded instructions executable on a processor of the internet-connected platform, digitally associated with the Offer Now button, an electronic form having check boxes and input fields, and a Submit button, the form enabling the person connected to configure a complete offer on one of the specific properties for sale or rent, the form displayed as a result of the person activating the Offer-Now button, and an Internet-connected service enterprise to which the plurality of partner platforms are registered, the service enterprise providing configurable coded instructions to the partners for displaying the Offer Now button, and for displaying the forms as a result of activating the Offer Now button. Upon a person activating the Offer Now button from a mobile device, a verification code is sent to the device, to be returned to verify the device, and offer input provided through the device and the electronic form is tracked to be saved as an offer for sale or rent of the specific property.

In one embodiment of the system, upon the person activating the Submit button, indicating the offer is configured and the person desires the offer to be considered, the person is solicited through the mobile device to download an executable participation application adapted for enabling the person to participate in negotiation with others in consideration of the submitted offer, and in downloading the participation application, the person is provided with a highly secure private key, stored only on the mobile device, enabling the participation and accessing a Blockchain wallet, to enable the person to fully participate in Blockchain processes in participation. Also in one embodiment the highly secure private key is associated on just the mobile device with a local password, usable for asserting the private key in signing in to participation in the system.

In one embodiment of the system, once an offer is submitted, and the offering person is enabled to participate, a listing agent of the partner enterprise is notified, and a consideration process is initiated, wherein service professionals deemed necessary to completion of a transaction are invited to participate, and the listing agent, the offering person, and the invited professionals, having accepted the invitations, are enabled to communicate through dashboards provided to every authorized participant to accomplish all necessary tasks to reach a conclusion for the offer, either acceptance or rejection. And in one embodiment invited participants, if not fully enabled to participate, are enabled with private keys and participation application executable on mobile devices and specific to their own mobile devices.

In one embodiment the dashboards provide communication channels to enabled participants, including at least a Chat service through a Chat server. Also in one embodiment the consideration process leads to an acceptance of the offer and completion of a sale or rent transaction on the property offered for sale or rent. Also in one embodiment professionals invited and enabled to participate include one or more of attorneys, inspection professionals, principals of a lending institution, and principals of a title insurance enterprise. In one embodiment, through the dashboards, participants are enabled to follow events as events occur, to track and aggregate, and to accept, reject or counter offers in real time, and wherein all participants receive push or text notifications throughout the process and can instantly chat with one another according to established protocols, and wherein all events are time stamped and are viewable in real time. And in one embodiment all events and document versions, including but not limited to purchase agreements, rental agreements, agency relationship disclosure agreements, mortgage pre-qualification documents, property condition reports, building/engineering inspection reports, pest inspection reports and all legal documents become Blockchain events stored in distributed locations by Blockchain functions, and are viewable and retrievable by authorized participants through their Blockchain wallets, and wherein payments are also managed by Blockchain technology.

In another aspect of the invention a transaction method is provided, comprising displaying to a person connected by a mobile device to one of a plurality of Internet-connected websites an Offer Now button, associating coded instructions executable on a processor of the internet-connected platform, digitally associated with the Offer Now button, the coded instructions provided by an Internet-connected service enterprise to which the plurality of partner platforms are registered, displaying, in response to activation of the Offer Now button, an electronic form having check boxes and input fields, and a Submit button, the form enabling the person connected to configure a complete offer, and sending a verification code to the mobile device to be returned to authorize configuring an offer.

In one embodiment of the method, upon the person activating the Submit button, indicating the offer is configured and the person desires the offer to be considered, comprises soliciting the person through the mobile device to download an executable participation application adapted for enabling the person to participate in negotiation with others in consideration of the submitted offer, and in downloading the participation application, providing the person with a highly secure private key, stored only on the mobile device, enabling the participation and accessing a Blockchain wallet, to enable the person to fully participate in Blockchain processes in participation. Also in one embodiment the method comprises associating the highly secure private key is on just the mobile device with a local password, usable for asserting the private key in signing in to participation in the system.

In one embodiment the method comprises, once an offer is submitted, and the offering person is enabled to participate, notifying a listing agent of the partner enterprise, and initiating a consideration process, wherein service professionals deemed necessary to completion of a transaction are invited to participate, and the listing agent, the offering person, and the invited professionals, having accepted the invitations, are enabled to communicate through dashboards provided to every authorized participant to accomplish all necessary tasks to reach a conclusion for the offer, either acceptance or rejection. And in one embodiment the method comprises enabling invited participants, if not fully enabled to participate, with private keys and participation application executable on mobile devices and specific to their own mobile devices.

In one embodiment the method comprises providing the dashboards with communication channels to enabled participants, including at least a Chat service through a Chat server. Also, in one embodiment the method comprises terminating the consideration process with acceptance of the offer and completion of a sale or rent transaction on the property offered for sale or rent. In one embodiment the method comprises inviting professionals, including one or more of attorneys, inspection professionals, principals of a lending institution, and principals of a title insurance enterprise to participate. In one embodiment the method comprises enabling, through the dashboards, participants to follow events as events occur, to track and aggregate, and to accept, reject or counter offers in real time, and pushing notifications to all participants throughout the process, enabling participants to instantly chat with one another according to established protocols, and time stamping all events in real time. And in one embodiment the method comprises making all events and document versions, including but not limited to purchase agreements, rental agreements, agency relationship disclosure agreements, mortgage pre-qualification documents, property condition reports, building/engineering inspection reports, pest inspection reports and all legal documents become. Blockchain events stored in distributed locations by Blockchain functions and are viewable and retrievable by authorized participants through their Blockchain wallets, and wherein payments are also managed by Blockchain technology.

BRIEF DESCRIPTION OF THE DRAWINGS

FIG. 4 illustrates a scrollable form for creating an offer in an embodiment of the invention.

DETAILED DESCRIPTION

The inventors in the present application offer a comprehensive system providing cooperative links between innovative processes and tools executing at enterprise-controlled platforms, and transaction platforms and inventory at any number of other platforms controlled by other businesses and individuals.

The invention in various embodiments and aspects provides an unprecedented speedy, simple and standardized real estate purchase offer process. The entire offer process in embodiments of the invention empowers the potential buyer to make an offer at any participating real estate website, to track, negotiate, and manage an offer, deal with counters, to update offers, to engage and collaborate various parties involved in a deal, to manage acceptance, to generate an offer agreement and other documentation required for a deal transaction, to facilitate payments, and to acquire real estate related service from available professionals. A speedy, rapid and simple real estate rental application process is provided in embodiments as well, enabling a potential renter to make rental offers, and to manage the process, on properties essentially anywhere, through any number of enterprises, and with individuals offering rental properties. Manual work and the turnaround time associated with a real estate offer or rental application process is reduced to a minimum.

In different aspects of the invention effective and transparent collaboration is accomplished between parties involved in any real estate purchase or rental offer and acceptance process and the marketplace, such as between buyers, agents, sellers, mortgage lenders, attorneys and more.

In addition to the above, in aspects of the invention valuable insights of regarding offers/applications received are provided to agents and homeowners, and others involved in a transaction. Offer and rental application information across the United States and even around the world is accessed and integrated in the innovative system. Better and standardized real estate practice, increased trust, integrity and auditability is provided to all parties involved through process and information transparency. Real estate offer and rental application processes are transformed into self-service. The system provides even more, which will be apparent to the skilled person by following the figures and descriptions of aspects and embodiments of the invention provided in enabling detail below.

Figure 1:
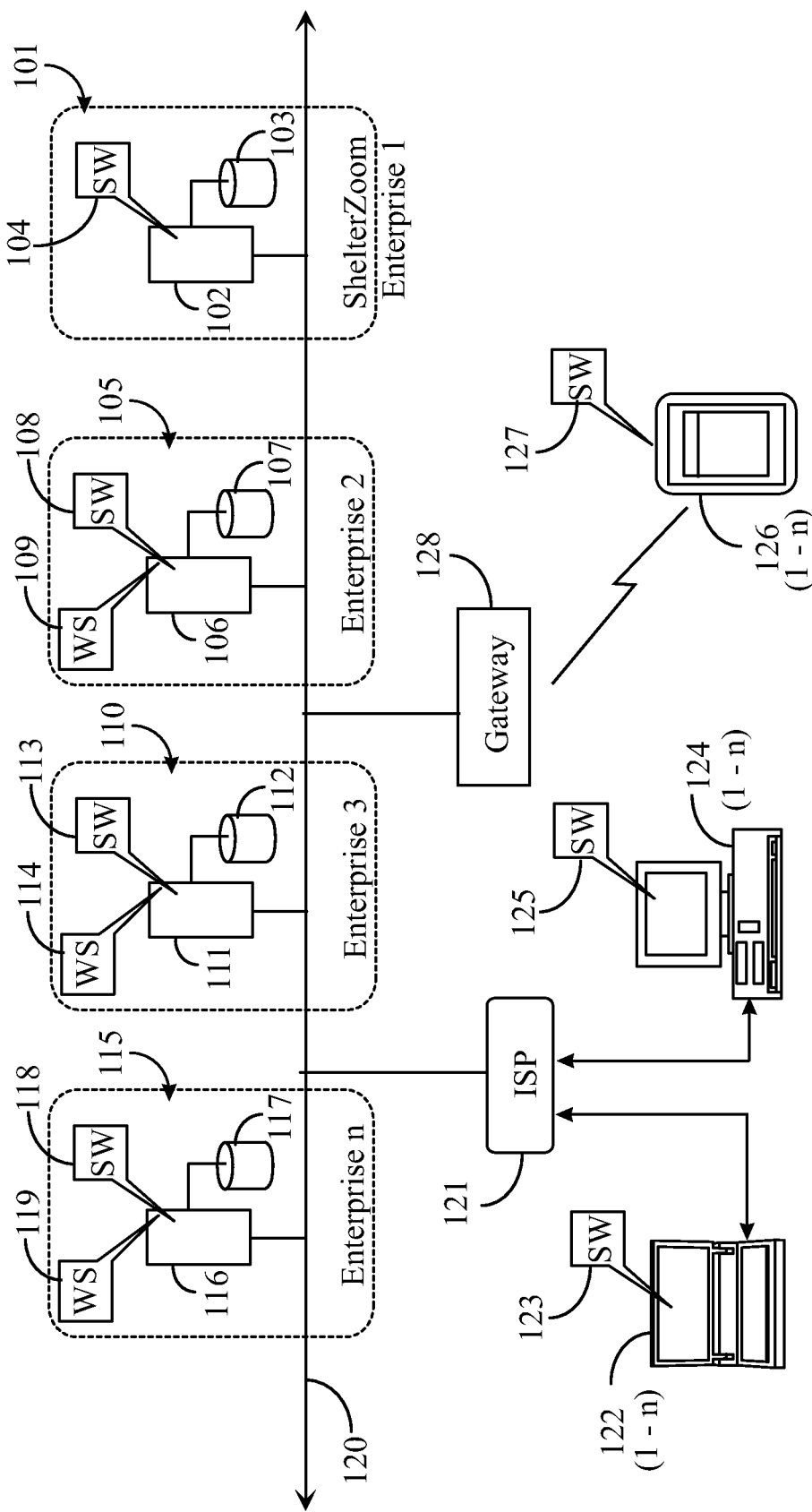
FIG. 1 is an architectural diagram of a system in one embodiment of the present invention.
Figure 2:
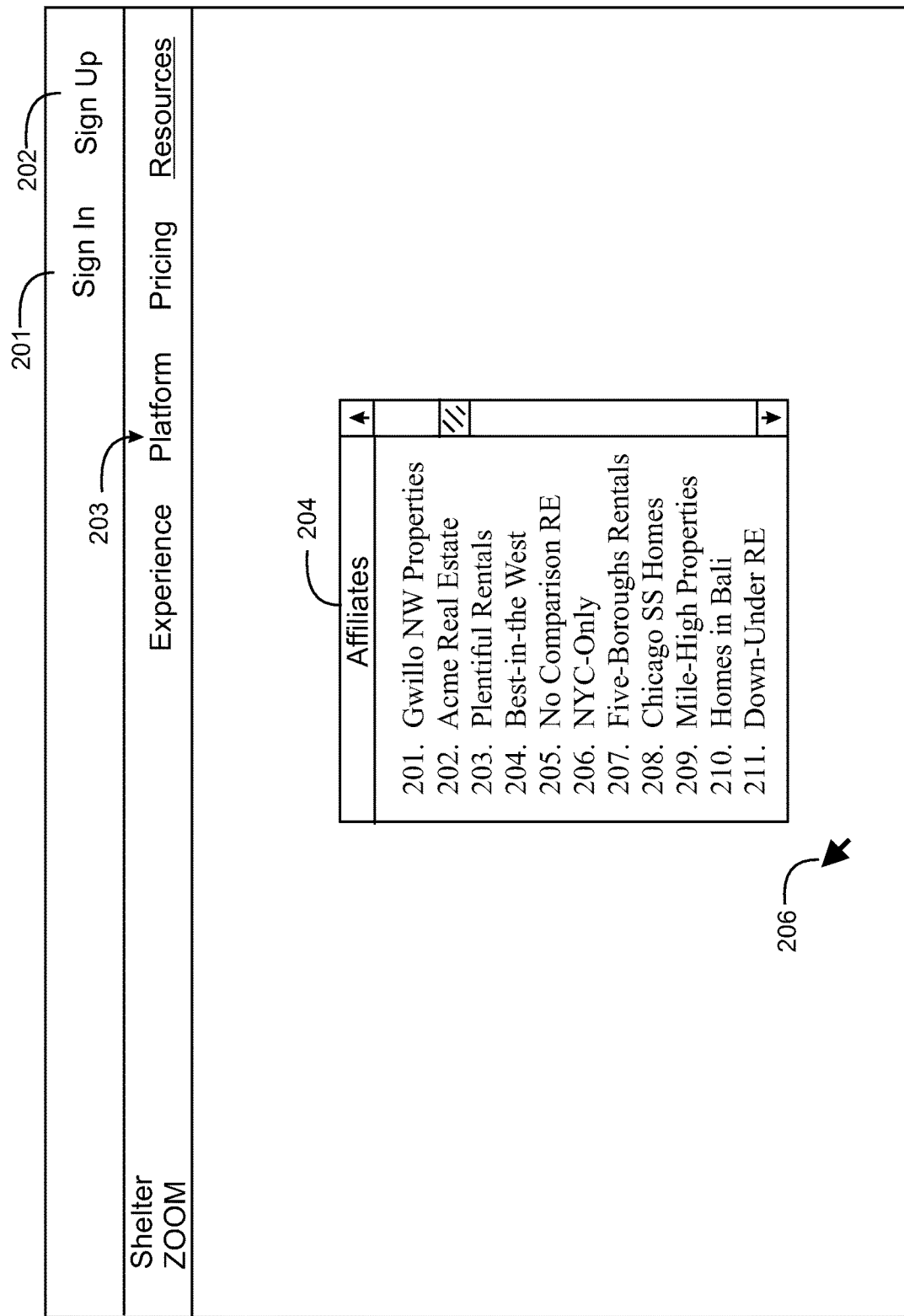
FIG. 2 illustrates a display for selecting affiliates in an embodiment of the invention.

FIG. 1 is an architectural diagram of a system in one embodiment of the present invention. In FIG. 1 a plurality of enterprises hosting digitized platforms are interconnected in a wide area network represented by backbone 120. The network in many embodiments of the invention is the well-known Internet network, and backbone 120 may be considered the Internet backbone, representing all of the interconnected networks and subnetworks that make up the Internet. An enterprise 101, labeled ShelterZoom Enterprise is shown connected to the network, with a server 102 executing software (SW) 104 coupled to a data repository 103. ShelterZoom is a name adopted by the inventors to represent the controlling enterprise in many embodiments of the present invention.

A first enterprise labeled Enterprise 1 is shown, having a server 106 connected to the Internet and coupled to a data repository 107. Server 106 executes SW 108, and also presents on the network a web site (WS) 109. A second enterprise labeled Enterprise 2 is shown, having a server 111 connected to the Internet and coupled to a data repository 112. Server 111 executes SW 113, and also presents on the network a web site (WS) 114. A third enterprise labeled Enterprise n is shown, having a server 111 connected to the Internet and coupled to a data repository 117. Server 116 executes SW 118, and also presents on the network a web site (WS) 119.

The ShelterZoom enterprise is a singular platform providing transaction integration, digital tools and controls in many embodiments of the invention. Enterprises 2 through n represent any number of enterprises that may be interacting with ShelterZoom and other enterprises in various aspects and circumstances in embodiments of the invention. In some specific cases these enterprises may be real estate sites where a potential home buyer may examine characteristics of properties offered for sale and may interact with the specific enterprise to at least negotiate and initiate a transaction for purchase of a property that may be offered for sale through that particular enterprise.

In other embodiments of the invention individual ones of enterprises 2 through n may be enterprises listing or offering properties for rent or lease, where an individual may interact with the specific enterprise to study details of properties offered for rent or lease, including terms, and may at least initiate a transaction to rent or lease a particular property.

In FIG. 1 a laptop computer 122 (1-n) executing SW 123 is shown connected to the Internet network through an Internet Service Provider (ISP) 121. Similarly, a desktop computer 124 (1-n) is shown also connected to the Internet through ISP 121. These computer platforms represent many such platforms that may be utilized by individuals, such as potential renters or buyers, to access enterprises 2-n to investigate opportunities for purchasing property offered for sale by individual ones of the enterprises, or to investigate opportunities to rent property offered for rent or lease by individual ones of the enterprises. A smartphone 126 (1-n) is also shown in FIG. 1 connecting to the internet through a gateway 128, representing any number of smartphones that may be used by individuals to interact with individual ones of enterprises 2-n.

It is well known that in negotiating a property sale or rental that it is often desirable and often necessary to enlist services of various sorts of tradespersons and professionals to enable the transaction. In the overall process of negotiating and completing a sale of a property between a seller or agent of the seller, and a buyer or agent of the buyer, there may be need for appraisal, various inspections, such as for termites, for example, application for a mortgage, and for a great many other services to forward and eventually complete a transaction. Various ones of the enterprises 2-n may be enterprises providing these sorts of services, and individual ones of the platforms connected through ISP 121 and gateway 128 may be used by professionals or tradespersons who become involved in negotiation and furthering transactions for sale or rent of properties.

System-Level

In the architecture of FIG. 1 at least one of the enterprises 2-n, which, in many embodiments may span thousands of enterprises, represents a Blockchain provider, such as for example Ethereum, which may provide services in document creation, storage, and security. Others, in various embodiments, may be platforms hosted by real estate enterprises, Brokers, Broker-affiliated Real Estate Agents, Rental Agents or by rental enterprises, among others, representing persons and enterprises offering properties for sale or rent.

In embodiments of the invention Enterprise 1 is a central hub of all services and interactions in the system. Also, in embodiments, Enterprise 1, through SW 104, provides a web site with a Domain name and a URL, through which a potential buyer or renter, that is, essentially any person seeking to purchase or rent a property, may connect via a web browser, using a browser-enhanced platform such as shown in FIG. 1 as elements 122, 124 and 126. Further below, the potential buyer or renter is depicted by the acronym PBR (for Potential Buyer/Renter).

A Sign-In link 201 is presented on this page of the site, and also on a home page, not shown, and other pages. A Sign-Up link 202 is also shown. An affiliate or registered person my sign in, with a mobile phone number and verification code, as is known. A new person, as a buyer or renter, or as an enterprise desiring to affiliate, may do so through the Sign-Up link. The detailed procedures are rather well-known for such registration and are not shown here.

A person, having accessed the resources page, may see a scrollable affiliates list 204, which may list hundreds of affiliated agents and enterprises, each listing comprising a link that may redirect the person to a site hosted by the affiliate. In another embodiment this display of affiliated enterprises is presented as company logos. In another embodiment the geographic location of affiliates is listed so a person reviewing will know where the affiliate is located.

Figure 3:
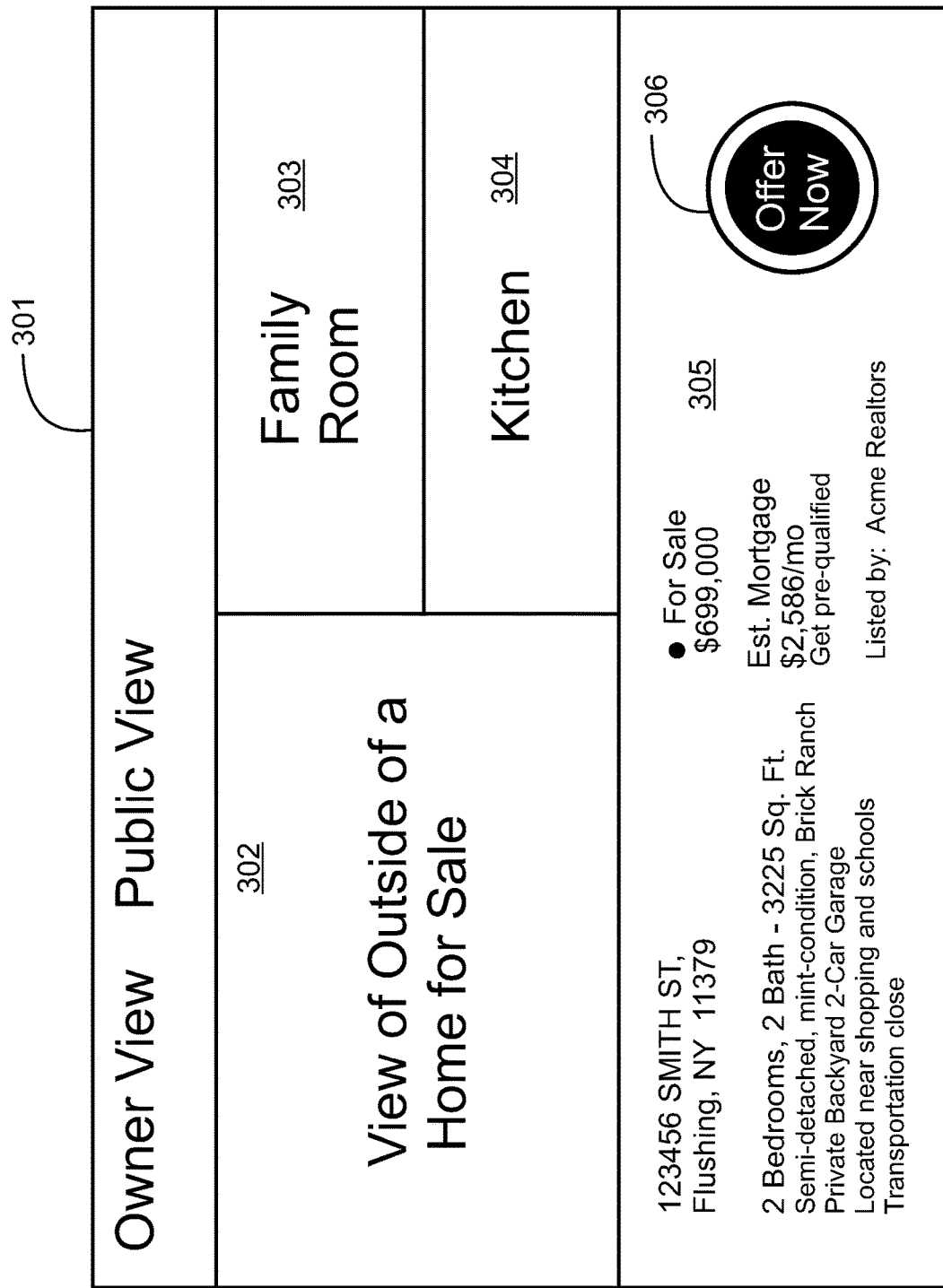
FIG. 3 shows a display of a property for sale by a listing site in an embodiment of the invention.

FIG. 3 is a representative page of a site to which a PBR may connect, that happens to be an affiliate of Enterprise 1, which may be ShelterZoom. FIG. 3 depicts details of a particular property currently offered for sale by the Affiliate. Outside pictures of the home (region 302), and also inside features as in regions 303 and 304 are shown. In some cases, there may be many more pictures, and perhaps videos, organized in a manner that the PBR may scroll through and get a very rich idea of the property and its characteristics.

Region 305 of the page provides text descriptions and details of the home for sale, such as bedrooms, baths, square footage, actual address, offering price, estimated mortgage details, and other information.

An Offer Now button 306 is shown to the right in this embodiment but is configurable to be placed in any other convenient location defined by an affiliate. This button is functional according to executable code provided by ShelterZoom via ShelterZoom's widget installation and configuration, integrated with and executable by the website of the offering entity. The "Offer NOW" button opens a container with all the embedded functionality of the widget right on an affiliate website, providing a great user experience. ShelterZoom is the first platform to generate offer agreements by using Ethereum Blockchain smart contracts technology.

In some embodiments of the invention, in the registration process for an enterprise to become an affiliate, for example a Real Estate firm offering homes for sale, there is a help process to guide the new affiliate in integrating the Offer Now, and in other cases a Rent Now button into the platform of the new affiliate.

There are three options in configuring the Offer button for use on an affiliate's website. As a first step a representative of the affiliate must determine which option will be preferable. The options are:

(a) The functionality when the button is selected, as a dialog window that integrates the site database with ShelterZoom (Enterprise 1). This is the most commonly used method to install the button and functionality, as all integrated property data will be auto-populated into the widgets after a user engages the Offer NOW™ and Rent NOW™ buttons.

(b) The functionality when the button is selected presenting a dialog window without database integration. In this case, all relevant property data is imported into the form presented after selection from an external feed. This method is generally recommended for websites that do not maintain a self-hosted listings database. This option is recommended for sites pulling data through an IDX vendor.

(c) The functionality when the button is selected presenting pop-up window, without database integration. The form is opened in a mini-window within the current browser window and all relevant property data will need to be manually inputted into the form. This method is generally reserved for sites created from subscription-based real estate website kits. Recommended for hosted sites such as Agent Image, WebsiteBox, etc.

Typically, a PBR will connect to a website either after viewing a property in person, or simply by browsing without specific direction, or may choose an affiliate from display at the ShelterZoom site.

The PBR, connecting to an affiliated site, discovering a property for sale, and deciding that an offer is desirable, activates the Offer Now button 306. Also in many circumstances it may be an agent of a PBR who connects to the affiliate site and makes an offer.

At the time of installing and activating the SZ_App the PBR is enabled to participate in the innovative processes by being granted a Security key, that in one embodiment is a key comprising twelve consecutive words. This key is used for this new user to access Blockchain wallet, and to fully participate in the Blockchain processes that ensue, and to access and in many cases edit documents that may be prepared as a part of the process of making an offer and negotiating purchase or rental of a property through an enterprise or agent affiliated with Enterprise 1. In some embodiments of the invention, recognizing that remembering a key of twelve words, and entering same each time access is required, is a challenge, the twelve-word key may be associated with a less complicated key, i.e., a local password, usable only on the particular mobile device that the PBR is using to participate. The same method is used for all other participants' key-chain management.

The PBR is now enabled to fully participate, and to enjoy all of the advantages of the systems of the invention.

The Offer Process

In this description of the offer process the person configuring an offer may be an individual that may become the buyer, or may be an agent of the individual. For convenience, this person will be termed an Offering Author. The Author may be the potential buyer or Renter, or an agent of that person.

The skilled person will understand, that in the conventional art, if there is an offer button on the depiction of a property for sale, and Offering Author activates the button, a communication may go to an email destination at the selling site, or some other communication, resulting in an agent of the seller contacting the Author to begin a manual process of entering an offer on the property. In embodiments of the present invention, however, an automated process is initiated, whereby an offer is generated under the control of the Offering Author.

FIG. 4 illustrates an automated offer form initiated by the Offering Author activating the Offer Now button 306 in FIG. 3. In many embodiments this scrollable offer form 401 is imposed on the display of the property offered for sale (FIG. 3), but this is not a limitation in the invention. The scrollable, Tillable form may be displayed in any convenient location, or in isolation. It is noted here that in the circumstance of rental property, the button is a Rent Now button, and details of the offer process will vary.

In FIG. 4 Offer Form 401 is shown in a first part, headed by the caption "Submit an Offer". The property address is indicated in the form, in this case as 3532 Alexandria Pike, Indianapolis, Ind. 95024, and will actually be the address of the property for sale in the affiliated website shown in FIG. 3 in this example. The address is different in this example, to be sure that the address is not for an actual property offered for sale by an actual real estate agency.

In this example an agent's name is associated with the property, and the agent's mobile phone is shown as well.

Next comes information regarding the purchaser, to be entered in fields 402 in form 401, who, in this example is the Author who has initiated the Offer Now button. That information is shown blank in FIG. 4, assuming that it has not yet been entered. Next the Author may check as the Buyer or the Buyer's agent.

This is a scrollable form, and the user may scroll down to further sections, to enter and configure the offer. Some details in the form may vary depending on state, city or other jurisdiction requirements. The fields included on the form are configurable via a ShelterZoom Affiliate Console provided to the affiliate. Typically, the Author may enter terms, such as offer price, earnest money, down payment, and loan amount. Or in the case of rental property, the fields may be different, and offers may be configured to offer a rental amount per month, security deposit, or another term, perhaps a lease term, employment information, and reference check. There may be a section to specify that the offer is subject to certain conditions, such as a termite inspection, a property inspection or attorney approval. Another section may enable the Author to specify items to be included or excluded in the sale or rental, such as major appliances. There may be a section to specify a mortgage lender, and to upload pre-qualifying documents. Attorney contact info and other information may be entered elsewhere. The form may also allow multiple buyers to be included in the process.

Near the end of the Offer Form there may be a checkbox to accept terms and conditions, and a means to review the terms and conditions before acceptance. At the end, as shown in the portion labeled 403, there may be a SUBMIT button, which enables the PBR to submit the offer for the property.

When an Offering Author first selects the Offer Now button, it is necessary for the system to at least identify the Author. This is accomplished by interaction with the mobile device in use by the Author to connect to the affiliate site. The system texts an authorization code to the mobile device, and requests that the Author enter the code for verification. After verification that form appears.

At the end of the form there is a Submit button. When the Author activates the submit button, the system sends a verification message to the PBR's mobile device for offer confirmation. Once the PBR confirms the offer, the offer becomes, in a sense, official. At this point the Author is requested to download an application termed here the SZ_App. If the application has not been loaded before, which enables the author, through the App executing on the mobile device, to generate Ethereum Blockchain smart contract, to fully participate in a following process, described below, in managing the offer that has been submitted. Among other functionality the Author is enabled with a Dashboard function that opens rich detail of the process to the Author, and enables the Author to fully participate in the process, including Chat and other negotiation, described more fully below.

Figure 5:
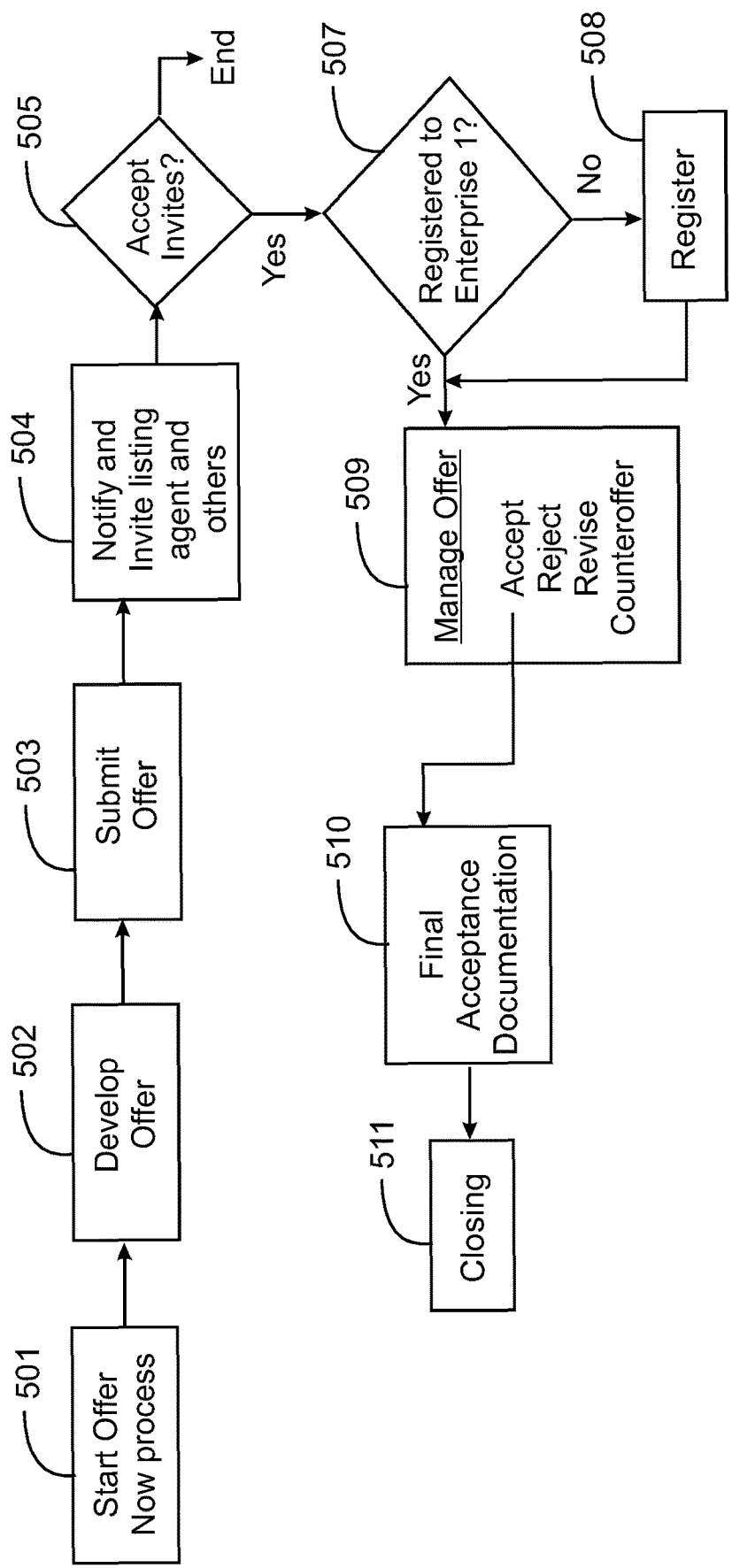
FIG. 5 is a flow diagram depicting a process for negotiating a sale or rental transaction after an offer in an embodiment of the invention.

FIG. 5 is a simplified flow diagram depicting various steps in the process of evolving and implementing a sale or rental transaction in an embodiment of the invention. At step 501 he Offering Author presses the Offer Now button on a property for sale at an affiliated enterprise site. The form is presented, and filled out. At the end of the offer the Author may or may not submit the offer.

Once the offer is submitted, the system may notify and invite a listing agent and other principles as needed and required by the offer, at step 504. The agent and others may accept the invitations at step 505.

Upon the necessary parties accepting the invites to participate, if one or more of these persons at step 507 is not registered to the service, that is Enterprise 1, the persons are registered and otherwise enabled as participants at step 508. This may involve generating a private key for each and downloading the SZ_APP, as well as generating smart contract for participants so that they can be included in a deal. With appropriate participants enabled, control goes to step 509, where the offer is managed. Now a new participant has joined a deal flow. He will immediately appear on the dashboard of other participants who are in the same deal.

Step 509 is a cover for a variety of activity that is potentially so variable that it is not practical to break out all possibilities and variables in this flow chart. There are many possibilities. One possibility is that the offer will simply be rejected by the seller or the seller's agent, in which case everyone is notified, and the process ends. The seller may have questions back to the Offering Author which may result in revisions to the offer. Revisions may be made and passed back through to the Manage Offer step at 509. In some cases a counteroffer may be made, which goes back to the buyer, to be accepted or rejected.

At some point, assuming outright rejection is not the result, the seller's agent will accept the offer in its final form. With acceptance, the process enters a closing phase at step 511, wherein all necessary papers are prepared as softcopy, and are distributed and signed electronically via Blockchain account encryption key, and become a part of the overall transaction.

Access

Referring to FIG. 3, considerable functionality within the system is described, and even more implied, by the steps in the overall process, and all of this activity is accomplished by individuals who are registered to the system and using devices typically executing the SZ_APP. The platform of Enterprise 1, which is ShelterZoom in this example, (FIG. 1) is the central controlling hub, and this platform provides interactive interfaces to individual ones of the participants in transactions. One way this is accomplished is by providing dashboards to participants, depending on the role of each participant.

Figure 6A:
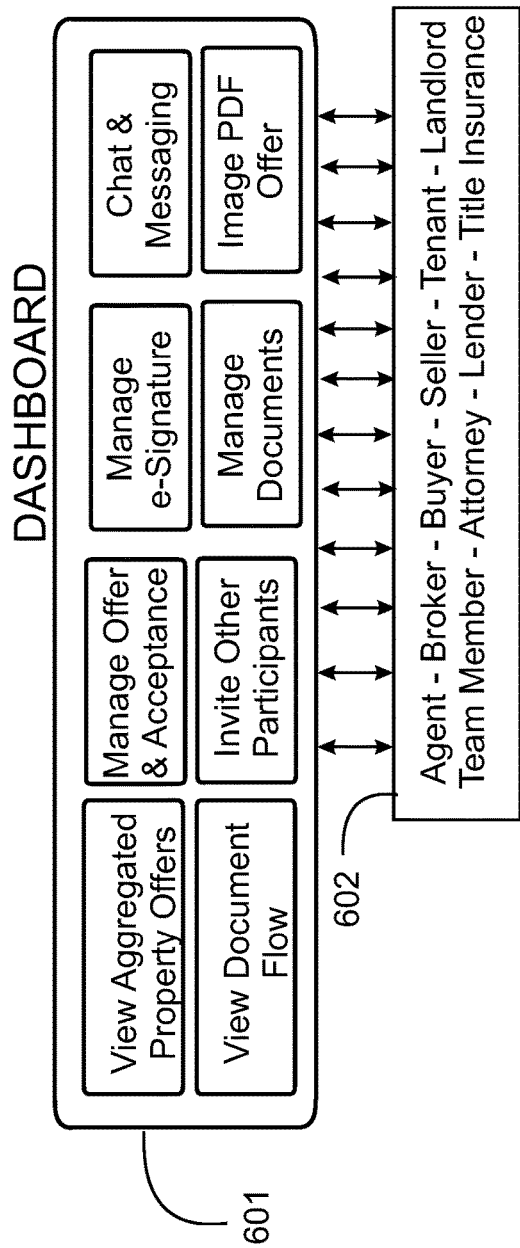
FIGS. 6A and 6B show dashboard displays in an embodiment of the invention.

FIG. 6A illustrates a simplified example of a dashboard as an interactive interface provided to a participant in an embodiment of the invention. Dashboards are provided both for desktop and mobile platforms to cover all devices that may be used by participants. A variety of roles of participants is displayed in box 602, and each of these, and others not named, may be provided access to information in the system, and in many cases ability to edit and perform other functions. A variety of functions that may be performed is shown in dashboard 601, as appropriate to individual ones of the participants.

Figure 6B:
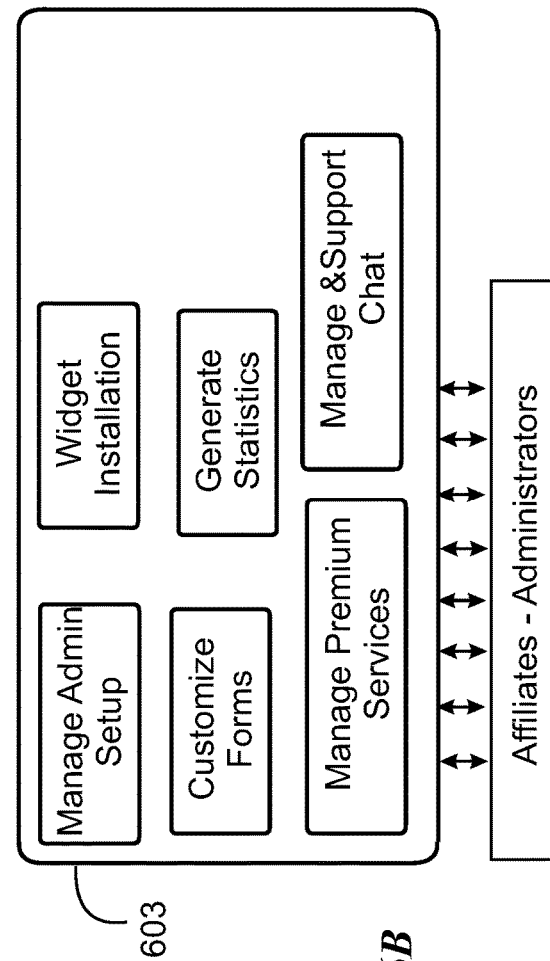

FIG. 6B illustrates an example of a dashboard that might be made available at the platform of Enterprise 1 for, in one instance, affiliates, these being partners that may incorporate the Offer Now and Rent Now widgets in their own sites. Administrators authorized at the site of Enterprise 1 may also operate through a dashboard to perform a variety of administrative functions. All of the participants must be fully affiliated to participate in the functionality of the system through various dashboards.

Dashboards

A dashboard available to essentially every user is a very important part of the present invention. The User Dashboard is a real-time, multi-party interactive and real estate offer management dashboard that uses Blockchain technology to make buying, selling and renting property more transparent, efficient, secure and profitable.

Within the user dashboard:
1. Users can set up profile and backup Blockchain twelve-word phrase (private key)
2. Users can view an Affiliate page and discover the participating websites where the Offer NOW and Rent NOW buttons are available to initiate an offer
3. Users can track and aggregate—as well as accept, reject or counter—offers in real time, while consumers and agents can track offer statuses through their own user dashboards.
4. Users can manage a set of events at any point of the offer and acceptance process
5. All parties receive push or text notifications throughout the offer process and can instantly chat with one another according to established protocols
6. All events are time stamped and are viewable in real time
7. Users can also sign offer agreements in Blockchain and generate documents.

This inventive user dashboard manages the end-to-end offer and acceptance process, and encompasses the following major features:

A. Property offer aggregation
  a. A user can view all property offers on one page. Any property that has been initiated through the offer process appears on the property offer aggregation page, so does any property that has been clicked on an offer button at a participating website by a PBR or his agent ("Offer Requester").
  b. For each property, the aggregated information includes number of offers received, buyer name, property source website from which the offer was made, and offer status with a corresponding color, e.g., offer signed (green), rejected (red), pending (blue), not submitted (orange). This one place—one page—gives a user a quick, yet comprehensive, view where all his/her property offers stand. This view replaces a large amount of paperwork from the existing practice. Currently, for a real estate professional or a regular property buyer/seller, it requires going through a few suitcases full of paper to find such details without such clarity in one glance.
  c. The page lists all the events across all widgets on all participating websites that are connected with the user that accesses the dashboard.
  d. Whenever appropriate, a source website page link to a necessary information page will be provided so that the user can access the information from the page.
  e. The user will be able to perform the following functionality in this section in embodiments of the invention:
    FILTER EVENTS (by offer status, time, country, state, property or user)
    SORT EVENTS (by offer status, time, country, state, property or user)
    SEARCH FOR EVENT (by keyword)
    SEARCH FOR OFFER STATUS
    DRILL DOWN TO VIEW DOCUMENT FLOW AND ACCESS THE NEXT LEVEL INFORMATION as discussed in the next section.

B. View Document Flow
  a. Upon clicking on the property box in the Property Offer Aggregation page above, a Document Flow screen will appear. This page gives a clear view of the entire history and events of an offer.
  b. The page includes each version of events happened for an offer, the party's name, the party's role in an event such as buyer, seller or agent, the event time, as well as a "View" button to allow a user to decrypt a smart contract and drill down to view the details of an offer version.

As mentioned earlier that a twelve-word key or local passcode associated to a user's Blockchain wallet is stored only on the user's mobile device. It is not stored on a PC or laptop for the security reason. To enable the decryption of a smart contract and view an offer version online from the user's PC or laptop, the user must unlock the Blockchain wallet using the particular mobile device where the key is stored. In order to do so, a QR scan function is provided in the dashboard for the user to open the Blockchain wallet on his mobile device, scan the QR code and synchronize the wallet on mobile with the wallet in the browser session on his PC or laptop. The key is only stored in the current PC browser key chain until the session is closed.

c. Events may include different User actions, and may be used for both action and analytic functions, for instance:
    A user joined the document flow—now having a private key assigned for this particular transaction
    A user viewed an offer
    An Offer Requester amends an offer
    An Offer Requester accepts or rejects a counter-offer
    An Offer Requester completed an e-signature to a document
    An agent reviewed the submission
    An agent revised the offer
    An agent accepted/rejected the submission
    An agent invited a party, e.g., a second buyer or seller, a co-worker, a broker, a team manager, a co-listing agent, a lender, an attorney
    An agent sent an offer to his client, e.g., buyer, seller, renter, landlord, to sign
    A client signs an offer
    A seller/landlord performs similar functions as an agent if no agent is engaged in the transaction
  d. Furthermore, for better user experience, each offer status is assigned a corresponding color, e.g., green for offer signed, and red for offer rejected. The "View" button color also changes as the flow progresses to provide a visually intuitive experience.
  e. In addition to the above, the page dynamically displays any new participant who joins a deal flow in real time, thus making user experience highly intuitive.

C. Manage Events and Actions

At any point of the offer and acceptance process, a user can manage a set of events and take appropriate actions against an offer (see the 1st screenshot below) throughout the process until the offer is either accepted or rejected (see the 2nd screenshot below).

For example, an agent can send an offer to seller/buyer to sign, invite a party (refer to the next section), revise an offer, reject an offer, or make a counter-offer on behalf of his client.

To assist easy understanding of what has been changed from the previous revision of an offer, the amended fields are highlighted in a different color.

In addition, a user can view an offer agreement document on the go. If an offer has been accepted, the document generated will reflect the acceptance status.

Similarly, if an offer has been rejected or is still in progress, the document generated will reflect the status accordingly.

D. Invite Parties
   a. A user can invite a required party during the process when appropriate, as part of events management mentioned above. For example, an agent can invite more buyer(s), seller(s), tenant(s) or landlord(s), invite his managing broker, co-worker, transaction manager, co-lister, and further invite a service provider such as an attorney, a lender, and a title insurer.
   b. This function is designed in a general way that any party can be invited into the deal flow. Once invited, Ethereum smart contract will be generated and a private key will be assigned to the participant.

E. Chat
   a. The skilled person will realize that a good deal of communication may be necessary between various participants, to accomplish the purposes of the system, property sales and property rentals. In one embodiment a Chat server is provided at the central hub, and chat communication is enabled between participants who use the available dashboards. In Chat embodiments a chat window is provided on the dashboards used by participants to initiate and accomplish chat. In other embodiments text, private email, private voice communication and video communication may also be made available.
   b. The Chat functionality described briefly above may be used by various parties involved in a real estate transaction or service for purpose of collaboration. In essence, the chat component further comprises:
      a Chat List which includes a list of all conversations
      individual Chat windows with history or events, documents and property information attached
      A configuration of user chat privilege, i.e., who can chat with whom. For example, a buyer cannot directly chat with a seller if a seller's agent is appointed.
   c. The Chat section will at least include the following functionalities:
      A list of active Chat sessions
      User name
      User online status
      Time of the Last Message
      Snippet of the Last Message
      Notifications about incoming messages
      Chat Window with ability to send and receive text messages, attach documents and photos
      Link to properties
      Collection of all attached documents
      Record voice messages
      Record video messages
      Events history F. Manage Documents and Electronic Signature
   a. Users can manage all documents that are relevant to a deal and services via the dashboard. Parties require signing a document can digitally sign it by using Blockchain account encryption key. The detailed explanation how documents are managed and signed can be found in the "Blockchain for +Document Generation and Payments" section
   b. The design is done in such a way that a user, e.g., an agent, can send any document to a required party in the deal to sign on Blockchain.

Administration Console
   Affiliates, or sometimes referred as Partners, will have their own section of the Enterprise 1 website dedicated to partners, with an ability to perform the following actions:

1. Configure Offer NOW and Rent NOW widget parameters
2. Access widget code
3. Access widget integration documentation
   The integration design is fully compliant with data standards defined by RESO (Real Estate Standard Organization), thus, further standardizes the offer process across the real estate industry.
4. Message ShelterZoom Technical support
5. Notifications about incoming messages
6. Review widget statistics on their Listings
   Partners can analyze detailed statistics and gain data insights on offers and rentals. The statistics include how many people have clicked the Offer NOW or Rent NOW button; number of users joined; how many offers submitted, created, revised, confirmed, signed or rejected; how many counter-offers made; how many parties invited; and so on so forth.
7. Customize form via form builder
   The configurable Form Builder allows partners from any country, region or site to customize widget layouts and PDF agreement forms to support partners' legal requirements.
   A partner can either leverage an available template, or customize based on an existing template, or build a new offer form which becomes the Offer NOW and Rent NOW widget screen layout.
   Furthermore, the fields captured during the offer and acceptance process can be mapped to a final agreement output form either provided by a partner or systematically generated by ShelterZoom at the absence of a supplied agreement output form.
   This is the first real estate form builder that is configurable and has the ability to support any regulatory environment both domestic and abroad.
8. Set up buyer agent premium service
   Buyer Agent Premium Service enables a partner to become a default buyer agent if an unrepresented buyer makes an offer via the partner's website. This enables the partner to generate more sales.

In order to configure and administrate a partner in the system, a separate Admin website is provided in various embodiments, with the ability to perform following functions:
1. Manage partner registration
2. Edit offer agreement, and widget forms and content for different localities and partners, as well as define and/or enable global templates
3. Configure widget parameters
4. Allow/disallow partner access
5. Review partner basic usage statistics
6. Chat with partners and agents through Support Chat
7. Notifications about incoming messages Blockchain for Document Generation and Payments
   The invention in many embodiments involves a system wherein participants are exchanging information without a need to establish trust. We can create such a system based on Blockchain technology because each of the participants has a set of public/private keys, so we can create an electronic signature for instance where the transaction is signed with a private key of the creator's account. The qualified electronic signature is a simple electronic signature with a private key and a ledger with public key. Private key is signing document hash.

Documents that are handled by Blockchain technology include, but are not limited to:
1. Binder Agreement (Purchase Agreement)
2. Rental Agreement
3. Agency Relationship Disclosure Agreement
4. Other Disclosure Agreement
5. Mortgage Pre-qualification
6. Property Condition Report
7. Building/Engineering Inspection Report
8. Pest Inspection Report
9. Legal documents In addition, payments such as service fees, earnest money, down payments, and rental deposits will also be managed by this technology.

In the Blockchain technology components a transaction can be created with hash of the data signed by the participant's private key, so the transaction may be verified as in fact created by the participant. So the authorization mechanism, and the technology makes it possible to implement a particular deal algorithm (or flow), without a need for a trusted third party (such as a bank, notary public etc.) since the logic which is implemented in the smart-contract on Blockchain does not change when it is created and is always open to anybody in such a way that it is guaranteed by all network participants (miners) who are verifying transactions.

All documents that authorized parties in the platform create, submit, exchange and sign as a part of the process are stored in a special secure storage, but their hashes are stored in a public Blockchain as smart contracts. Every transaction then can be publicly verified using public key. All other steps of the process will also be verifiable using the same mechanism, so the trusted independent document exchange system is created.

All the verification criteria is created as separate smart contracts. This creates a global system for real estate deals where all the deal operations are signed, and deal flow is persistent.

Figure 10:
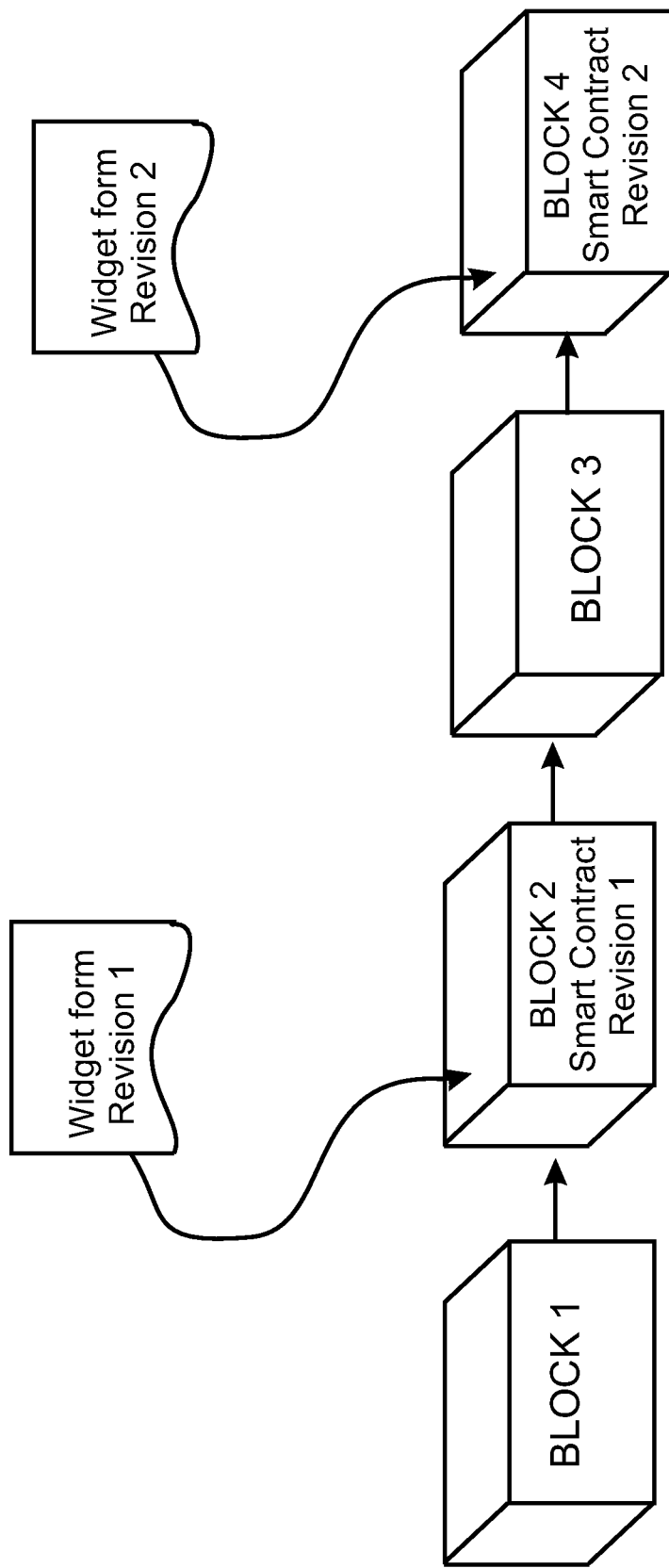
FIG. 10 illustrates Blockchain interaction in an embodiment of the invention.

FIG. 10 is a simplified block diagram illustrating creation and revision of offer forms, using the widgets called Offer Now. Once the Widget form is filled it is assigned with a Blockchain wallet and submitted to the Blockchain. A smart contract is created for that form and invitations are sent to the contract form participants. All users join using their Blockchain wallets (i.e. Private Keys) and all their interactions regarding this contract form are stored in this smart contracts as transactions which are verified and included in the block.

Marketplace—Real Estate Service Model

An important feature of the present invention in one aspect is a competitive and transparent real estate marketplace, supported by a real estate service model with a spider-web-like service provider network and collaboration, all coordinated and harmonized on one platform. This new marketplace will enable real estate consumers to conveniently acquire comprehensive and competitive real estate-related service including legal, mortgage, building and pest inspection, insurance, moving, storage, renovation and more.

In this model a real estate consumer can procure one or more services through an online service catalogue, leveraging a single and secure service provider network. The consumer can define a service provider criteria and/or lead time for a service. Alternatively, the system can recommend a service provider selection criteria. The appropriate service provider is then matched to serve the consumer. One way of rewarding the job to the right service provider is via job bidding. Once the service provider(s) join the workflow, the system will work out an appropriate timeframe for a required service or a sequence for multiple services, and execute services one after another to meet a consumer's timeframe.

The Chat function and Blockchain technology described in enabling detail elsewhere plays a major role in matching the right service provider to a consumer, collaborating between a consumer and a service provider, and amongst multiple service providers whose services are time dependent. This model differs from the existing real estate industry model in which real estate selling or renting services are bundled, whereas external services such as mortgage, legal or engineering are un-coordinated.

A service catalogue may include, without limitation:
Home staging
Photography
Floor plan
Property listing
Property viewing
Property negotiation
Marketing
Mortgage Finance
Legal
Insurance
Building inspection
Pest inspection
Engineering
Repair and Maintenance
Cleaning
Moving
Utility connect and disconnect
Telephone connect and disconnect
Emergency accommodation Offers on Unlisted Property In another aspect of the invention a potential buyer or renter, which is still represented by the acronym PBR, may create a smart contract offer to buy or rent a property in much the manner described above with reference to FIGS. 3, 4 and 5, without necessity of the particular property having been listed by a partner of Enterprise 1.

As a first example, a PBR may browse web sites hosted by any real estate enterprise not affiliated with Enterprise 1, and select a property for an offer, in which case there will be no Offer Now button associated with the particular property. The PBR in this case may note or copy the address of the property, and in this example the name and phone number of the listing agent, and then connect to an affiliate of Enterprise 1.

Figure 7:
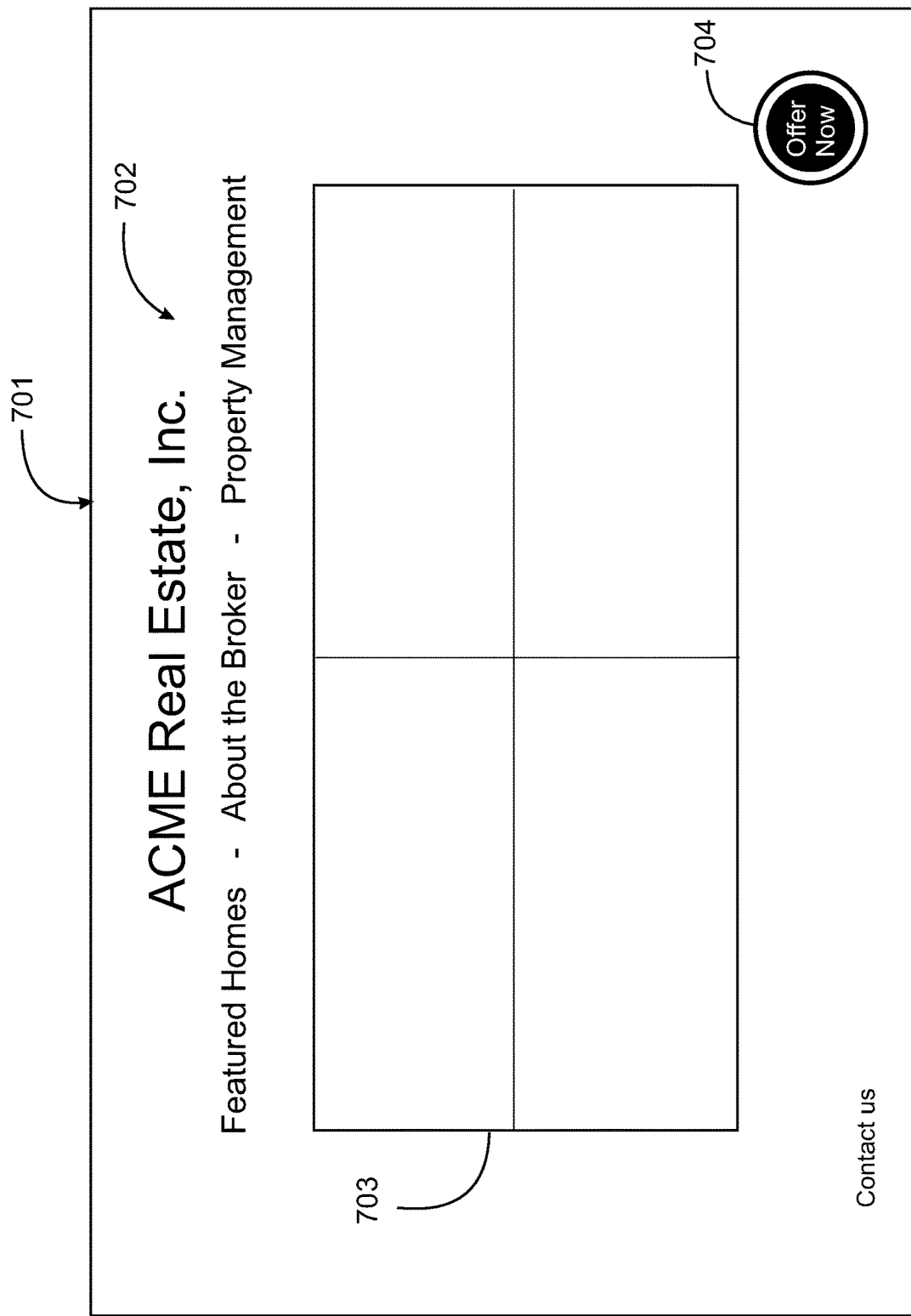
FIG. 7 shows a home page of a sale enterprise with a button according to an embodiment of the invention.
Figure 8B:
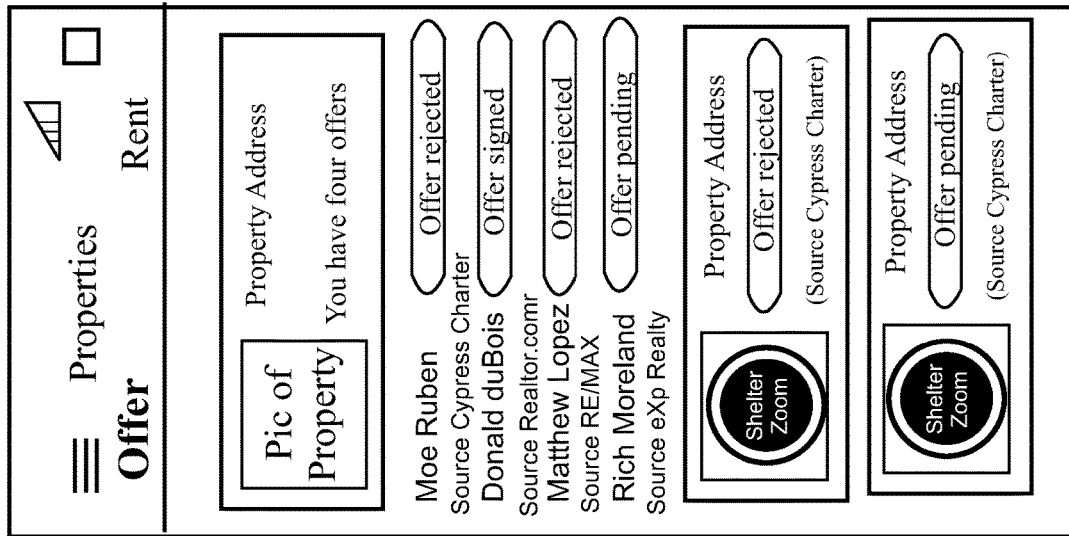
FIGS. 8A and 8B illustrate dashboard displays on a mobile device for all property offers in an aggregated view.
Figure 8A:
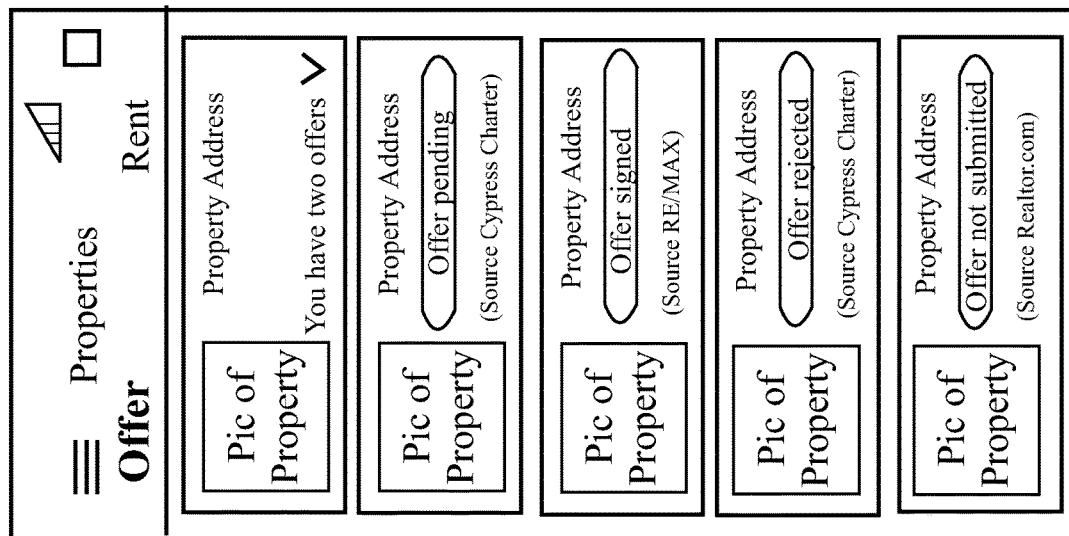
Figures 9A, 9B:
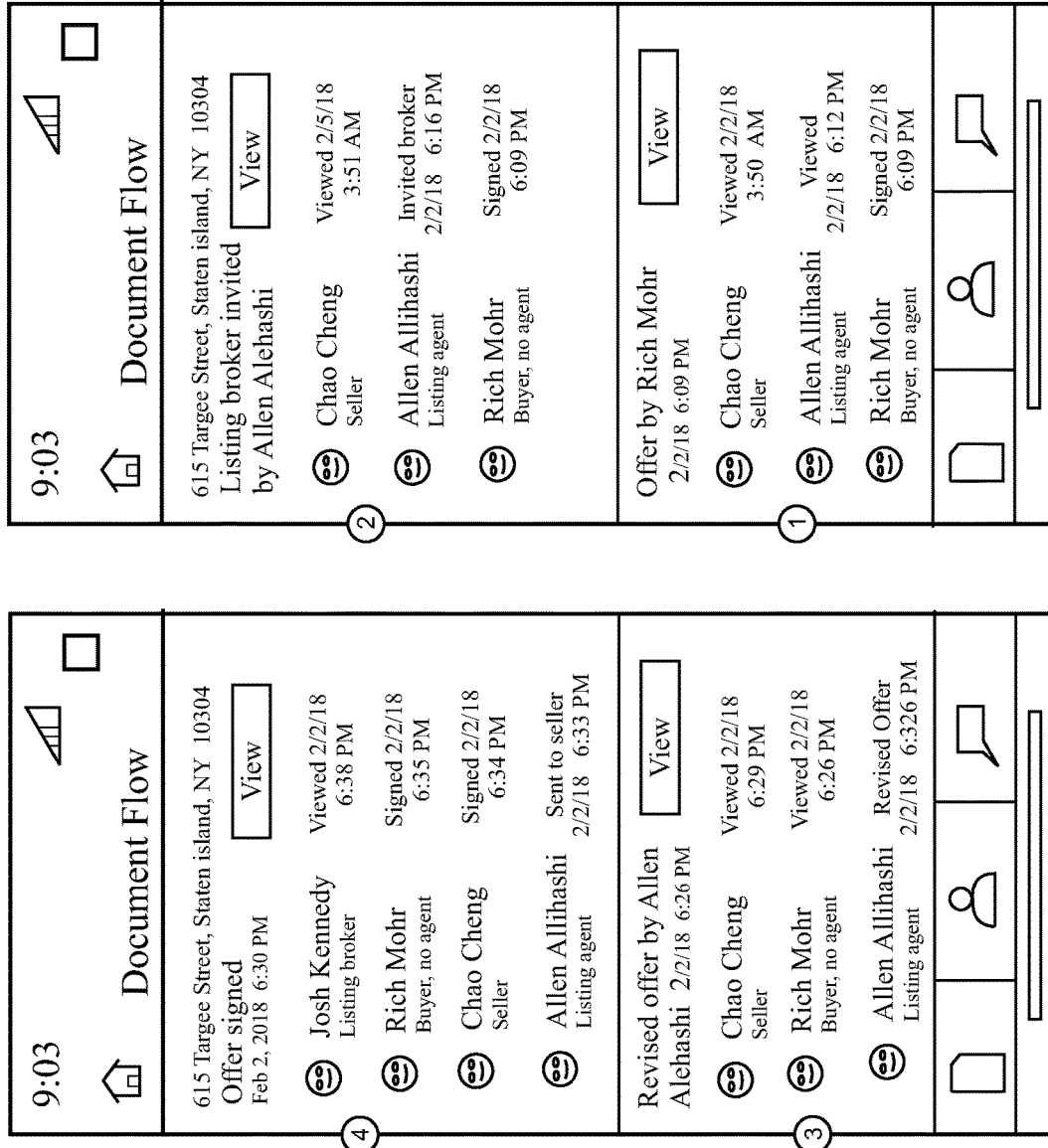
FIGS. 9A and 9B illustrate dashboard displays on a mobile device for the document flow of events and event history of one offer.

FIG. 7 illustrates a Home Page of such an affiliate. On the Home Page of the affiliate there will be, in most embodiments of the system, an Offer Now button 704, which is different in some functional respects than button 306 of FIG. 3, which is associated with the specific property illustrated and described in FIG. 3. Button 704 may be identical in appearance to button 306 and may be differentiated just by its position in display on the affiliate site, or it may be differentiated visually by color, size, design, or in some other way.

Button 704 is not associated with a specific property, so when selected, will not list a specific property, as seen in FIG. 4, under the heading "Submitting an offer on:" Instead, when link 704 is selected, an offer creation form similar to that of form 401 will be displayed, in which the property address is an entry field where the PBR may enter the address of the property which he or she copied above, from a not-affiliated site. The agents name will be entered as an agent of the affiliated site.

The process of creating the smart contract offer and binding same will be parallel to that described above with reference to FIGS. 4 and 5. After the offer is completed and is ready to submit, submission will be to an agent at the either affiliated or not-affiliated site where the property in question is offered for sale. This may be responsibility of the agent of the affiliated site entered in the offer document.

In some cases, a PBR might identify a property that is not listed for sale or rent, and still desire to make an offer on the property. This example includes both properties that may be offered "for sale by owner", and properties not for sale at all. Link 704 can be used in this respect as well, as long as the PBR gets an address for the property, hopefully some further details about the property, and at least a telephone number for the owner of the property or an agent who can represent the PBR. The PBR may initiate and create the offer through link 704, and the agent of the affiliated site can deliver the offer to the property owner.

In the case of a property owner that might be contacted with an offer, the property owner may have the option of becoming affiliated with enterprise 1, and downloading the SZ_APP, as well as acquiring a private key, which will enhance the process for the property owner.

Embodiments of the invention have been depicted and described above by example, and details in many cases may vary from specific detail described in examples. The skilled person will be aware that many such variations are properly within the scope of the present invention, which is limited only by the scope of the claims below.

What is claimed is:

1. A computer implemented method, comprising:
    registering, at an offer management server, one or more of a plurality of Internet-connected servers, the one or more of the plurality of Internet-connected servers hosting respective websites;
    providing, from the offer management server to the one or more of the plurality of Internet-connected servers, configurable coded instructions for displaying an Offer Now button on the respective web sites;
    connecting a mobile device of a user to the one or more of the plurality of the Internet-connected servers;
    displaying, by the one or more of the plurality of Internet-connected servers, the Offer Now button on the Internet-connected server's respective web site using the configurable coded instructions received from the offer management server;
    receiving, via the mobile device, a user selection of the Offer Now button;
    in response to receiving the user selection of the Offer Now button, transmitting, from the one or more of the plurality of Internet-connected servers, an authorization code to the mobile device to identify the user;
    requesting, by the one or more of the plurality of Internet-connected servers, the user to enter the authorization code;
    in response to receiving the authorization code entered by the user, displaying, by the one or more of the plurality of Internet-connected servers, an electronic form on the Internet-connected server's respective website, wherein the electronic form includes input fields for a user to submit offer information for a transaction;
    receiving, at the one or more of the plurality of Internet-connected servers, the offer information via the electronic form;
    transmitting, by the one or more of the plurality of Internet-connected servers, the electronic form with the offer information to the offer management server;
    receiving, at the offer management server and from the one or more of the plurality of Internet-connected servers, the electronic form with the offer information;
    generating, by the offer management server, a hash of the electronic form by hashing the offer information;
    storing, by the offer management server, the hash on a blockchain as a smart contract; and
    requesting, by the offer management server, the user to download a software application onto the mobile device for providing a dashboard to manage one or more transactions from the respective websites.

2. The computer implemented method of claim 1, wherein displaying the electronic form further comprises:
    automatically populating, by the one or more of the plurality of Internet-connected servers, the electronic form with information from the Internet-connected server's respective website.

3. The computer implemented method of claim 1, wherein the offer form includes a field for specifying a condition corresponding to the transaction and wherein the condition is included in the offer information.

4. The computer implemented method of claim 1, further comprising:
    updating the dashboard to display an interaction with the electronic form, wherein the interaction indicates an acceptance of the offer information, a rejection of the offer information, or a counter offer corresponding to the offer information.

5. The computer implemented method of claim 1, wherein the offer form includes a field for indicating whether the user is a buyer or an agent of a buyer.

6. The computer implemented method of claim 1, further comprising:
    displaying a chat window on the dashboard configured to deliver messages from the user to parties of the transaction.

7. The computer implemented method of claim 1, further comprising:
    receiving, at the offer management server, a second document file related to the transaction;
    associating, by the offer management server, the second document file with the electronic form; and
    storing, by the offer management server, the second document file on the blockchain.

8. An offer management system, comprising:
    an offer management server registering one or more of a plurality of Internet-connected servers,
        the one or more of the plurality of Internet-connected servers hosting respective web sites,
        the at least one server providing configurable coded instructions to the one or more of the plurality of Internet-connected servers for displaying an Offer Now button on the respective websites; and
    a mobile device of a user connected to the one or more of the plurality of Internet-connected servers,
    wherein each of the one or more of the plurality of Internet-connected servers are configured to:
        display the Offer Now button on the Internet-connected server's respective website using the configurable coded instructions received from the offer management server;
        receive, via the mobile device, a user selection of the Offer Now button via the Internet-connected server's respective web site;

in response to receiving the user selection of the Offer Now button, transmit an authorization code to the mobile device to identify the user;

request the user to enter the authorization code;

in response to receiving the authorization code entered by the user, display an electronic form on the Internet-connected server's respective web site, wherein the electronic form includes input fields for a user to submit offer information corresponding to one of the specific properties for sale or rent;

receive the offer information via the electronic form;

transmit the electronic form with the offer information to the offer management server, and wherein the offer management server is further configured to:

receive the electronic form with the offer information;

generate a hash of the electronic form by hashing the offer information corresponding to one of the specific properties for sale or rent;

store the hash on a blockchain as a smart contract; and request the user to download a software application onto the mobile device for providing a dashboard to manage one or more transactions from the one or more websites.

9. The system of claim 8, wherein to display the electronic form, each of the one or more of the plurality of Internet-connected servers are further configured to:

automatically populate the electronic form with information from the Internet-connected server's respective website.

10. The system of claim 8, wherein the offer form includes a field for specifying a condition corresponding to the transaction and wherein the condition is included in the offer information.

11. The system of claim 8, wherein the offer management server is further configured to:

update the dashboard to display an interaction with the electronic form, wherein the interaction indicates an acceptance of the offer information, a rejection of the offer information, or a counter offer corresponding to the offer information.

12. The system of claim 8, wherein the offer form includes a field for indicating whether the user is a buyer or an agent of a buyer.

13. The system of claim 8, wherein the offer management server is further configured to:

display a chat window on the dashboard configured to deliver messages from the user to parties of the transaction.

14. The system of claim 8, wherein the offer management server is further configured to:

receive a second document file related to the transaction;

associate the second document file with the electronic form; and store the second document file on the blockchain.

15. A non-transitory computer-readable device having instructions stored thereon that, when executed by at least one computing device, cause the at least one computing device to perform operations comprising:

registering, at an offer management server, one or more of a plurality of Internet-connected servers, the one or more of the plurality of Internet-connected servers hosting respective websites;

providing, from the offer management server to the one or more of the plurality of Internet-connected servers, configurable coded instructions for displaying an Offer Now button on the respective web sites;

connecting a mobile device of a user to the one or more of the plurality of the Internet-connected servers;

displaying, by the one or more of the plurality of Internet-connected servers, the Offer Now button on the Internet-connected server's respective web site using the configurable coded instructions received from the offer management server;

receiving, via the mobile device, a user selection of the Offer Now button;

in response to receiving the user selection of the Offer Now button, transmitting, from the one or more of the plurality of Internet-connected servers, an authorization code to the mobile device to identify the user;

requesting, by the one or more of the plurality of Internet-connected servers, the user to enter the authorization code;

in response to receiving the authorization code entered by the user, displaying, by the one or more of the plurality of Internet-connected servers, an electronic form on the Internet-connected server's respective website, wherein the electronic form includes input fields for a user to submit offer information for a transaction;

receiving, at the one or more of the plurality of Internet-connected servers, the offer information via the electronic form;

transmitting, by the one or more of the plurality of Internet-connected servers, the electronic form with the offer information to the offer management server;

receiving, at the offer management server and from the one or more of the plurality of Internet-connected servers, the electronic form with the offer information;

generating, by the offer management server, a hash of the electronic form by hashing the offer information;

storing, by the offer management server, the hash on a blockchain as a smart contract; and requesting, by the offer management server, the user to download a software application onto the mobile device for providing a dashboard to manage one or more transactions from the respective websites.

16. The non-transitory computer-readable device of claim 15, wherein displaying the electronic form further comprises:

automatically populating, by the one or more of the plurality of Internet-connected servers, the electronic form with information from the Internet-connected server's respective website.

17. The non-transitory computer-readable device of claim 15, wherein the offer form includes a field for specifying a condition corresponding to the transaction and wherein the condition is included in the offer information.

18. The non-transitory computer-readable device of claim 15, the operations further comprising:

updating the dashboard to display an interaction with the electronic form, wherein the interaction indicates an acceptance of the offer information, a rejection of the offer information, or a counter offer corresponding to the offer information.

19. The non-transitory computer-readable device of claim 15, the operations further comprising:

displaying a chat window on the dashboard configured to deliver messages from the user to parties of the transaction.

20. The non-transitory computer-readable device of claim 15, the operations further comprising:

receiving, at the offer management server, a second document file related to the transaction;

associating, by the offer management server, the second document file with the electronic form; and storing, by the offer management server, the second document file on the blockchain.

\* \* \* \* \*